(12) United States Patent
Lissianski et al.

(10) Patent No.: US 7,544,339 B2
(45) Date of Patent: Jun. 9, 2009

(54) METHOD AND APPARATUS FOR REMOVING MERCURY FROM COMBUSTION EXHAUST GAS

(75) Inventors: Vitali Victor Lissianski, San Juan Capistrano, CA (US); Peter Martin Maly, Lake Forest, CA (US); William Randall Seeker, San Clemente, CA (US); Robert Warren Taylor, Ponte Vedra Beach, FL (US)

(73) Assignee: General Electric Company, Schenectady, NY (US)

( * ) Notice: Subject to any disclaimer, the term of this patent is extended or adjusted under 35 U.S.C. 154(b) by 203 days.

(21) Appl. No.: 11/691,876

(22) Filed: Mar. 27, 2007

(65) Prior Publication Data

US 2008/0241027 A1 Oct. 2, 2008

(51) Int. Cl.
*B01D 53/64* (2006.01)
*B01D 53/74* (2006.01)
*B01D 53/83* (2006.01)

(52) U.S. Cl. ............... 423/210; 422/168; 422/187; 110/203; 110/216; 110/234; 110/322; 95/134

(58) Field of Classification Search ........... 423/210; 95/134; 422/168, 187; 110/203, 216, 234, 110/322
See application file for complete search history.

(56) References Cited

U.S. PATENT DOCUMENTS

| | | | |
|---|---|---|---|
| 3,817,713 A * | 6/1974 | Ionescu | 422/120 |
| 3,919,389 A * | 11/1975 | Jonescu | 423/210 |
| 4,273,747 A | 6/1981 | Rasmussen | |
| 5,507,238 A | 4/1996 | Knowles | |
| 6,027,551 A | 2/2000 | Hwang et al. | |
| 6,206,685 B1 | 3/2001 | Zamansky et al. | |
| 6,280,695 B1 | 8/2001 | Lissianski et al. | |
| 6,451,094 B1 | 9/2002 | Chang et al. | |
| 6,471,506 B1 | 10/2002 | Zamansky et al. | |
| 6,521,021 B1 | 2/2003 | Pennline et al. | |
| 6,595,147 B2 | 7/2003 | Teller et al. | |
| 6,604,474 B2 | 8/2003 | Zamansky et al. | |
| 6,694,900 B2 | 2/2004 | Lissianski et al. | |
| 6,726,888 B2 | 4/2004 | Lanier et al. | |
| 6,863,005 B2 | 3/2005 | Lanier et al. | |
| 6,895,875 B1 | 5/2005 | Lissianski et al. | |
| 6,953,494 B2 * | 10/2005 | Nelson, Jr. | 95/134 |
| 6,981,456 B2 | 1/2006 | Lissianski et al. | |
| 7,429,365 B2 * | 9/2008 | Taylor | 423/210 |
| 2005/0036926 A1 | 2/2005 | Lissianski et al. | |
| 2005/0106516 A1 | 5/2005 | Payne et al. | |
| 2005/0129600 A1 | 6/2005 | Lanier et al. | |
| 2005/0147549 A1 | 7/2005 | Lissianski et al. | |
| 2005/0274307 A1 | 12/2005 | Lissianski et al. | |
| 2006/0021554 A1 | 2/2006 | Lissianski et al. | |
| 2006/0120934 A1 | 6/2006 | Lanier et al. | |
| 2007/0116616 A1 | 5/2007 | Taylor | |
| 2008/0011158 A1 | 1/2008 | Barger et al. | |

* cited by examiner

*Primary Examiner*—Timothy C Vanoy
(74) *Attorney, Agent, or Firm*—Armstrong Teasdale LLP

(57) ABSTRACT

A method for reducing mercury emissions in combustion flue gas is provided. The method includes combusting coal such that a flue gas flow is created. The flue gas flow includes at least mercury and carbon-containing fly ash. The method further includes cooling the flue gas flow within a duct and creating turbulence in the flue gas flow. The mercury is removed from the flue gas flow.

19 Claims, 1 Drawing Sheet

METHOD AND APPARATUS FOR REMOVING MERCURY FROM COMBUSTION EXHAUST GAS

BACKGROUND OF THE INVENTION

This invention relates generally to combustion devices and, more particularly, to emission control systems for combustion devices.

During a typical combustion process within a furnace or boiler, for example, a flow of combustion gas, or flue gas, is produced. Known combustion gases contain combustion products including, but not limited to, carbon, fly ash, carbon dioxide, carbon monoxide, water, hydrogen, nitrogen, sulfur, chlorine, and/or mercury generated as a result of combusting solid and/or liquid fuels.

The volatile metal mercury, Hg, is an air pollutant produced through coal combustion. Mercury released from coal during combustion is readily aerosolized and can become airborne. Airborne mercury may travel globally prior to being deposited into soil and water. Mercury deposited in the environment is a persistent and toxic pollutant that may accumulate in the food chain. For example, mercury can be transformed within microorganisms into methylmercury, and consumption of contaminated fish is the major route of human exposure to methylmercury. Methylmercury is toxic to humans and has been shown to cause disorders of the nervous system, comas, heart disease, and death. Moreover, the adverse affects of methylmercury may be more severe to children and women of childbearing age.

Mercury emissions from coal-fired power plants are the subject of governmental regulation. The control of mercury emissions is complicated by the several forms mercury may take within combustion flue gas. For example, at combustion temperatures, mercury is present in flue gas in its elemental form, $Hg^0$, which may be difficult to control because elemental mercury is easily volatized and unreactive. Mercury reacts with carbon as flue gas cools below 1000° F., and such reactions may convert mercury to its highly reactive, oxidized form, $Hg^{+2}$. Mercury may also be absorbed in fly ash and/or other flue gas particles to form particulate-bound mercury, Hgp.

Because mercury can take several forms, known control technologies do not effectively control mercury emission for all coal types and for all combustion configurations. Some known mercury control technologies take advantage of mercury's reactivity with carbon and use carbon as a mercury sorbent to form oxidized mercury. Carbon may be formed in-situ during the combustion process as a result of incomplete coal combustion or may be injected into mercury-containing flue gas in the form of activated carbon. Further, carbon in the presence of chlorine, Cl, may increase the oxidation of elemental mercury. In the flue gas, mercury can be converted to its oxidized form, $Hg^{+2}$, and react with chlorine-containing species to form mercuric chloride, $HgCl_2$. As such, the extent of mercury oxidation in flue gas is generally higher for coals with a higher chlorine content, such as bituminous coals, and lower for coals with a lower chlorine content, such as low-rank coals.

Mercury may be removed from flue gas by reacting with carbon in high-carbon fly ash formed in-situ in the combustion process. High-carbon fly ash is formed during the combustion of bituminous coals in coal reburning and air staging, and may be an effective mercury sorbent. Other coals, such as, for example, Powder River Basin (PRB) and lignite coals, are considered low-rank coals, and as such, represent a significant portion of the coal energy market. Such coals often have a low sulfur content that solves the problem of sulfur dioxide, $SO_2$, emissions, but may also have a low chlorine content. As such, the mercury in low-rank coals may not be oxidized because of a lack of chlorine and the presence of other constituents that tend to suppress mercury oxidation. As a result, mercury released during combustion is primarily elemental mercury. Moreover, because of the high reactivity of low-rank coals, fly ash from the combustion of such coals usually has a low carbon content. Coal reburning and air staging, which typically increases the carbon content in fly ash for bituminous coals, usually does not significantly increase the carbon-in-fly ash content for low-rank coals. As such, mercury removal through reactions with carbon-in-fly ash may not be effective because such fly ash does not have a sufficient amount of carbon with which the mercury can react.

One known mercury control technology injects a sorbent, usually activated carbon, into the flow of flue gas to react with mercury therein. Because carbon is more reactive towards mercury at temperatures below 350° F., activated carbon is typically injected upstream from a particulate collection device, such as an electrostatic precipitator or a baghouse. Oxidized mercury is the most easily removable form of mercury by injecting sorbent. As a result, the higher the fraction of oxidized mercury in flue gas, the higher the efficiency of mercury removal. Depending on the sorbent injection configuration and coal type, the efficiency of mercury removal typically ranges from 40% to 90% removal of mercury emissions. However, the cost of using activated carbon for mercury control may be expensive, and as such, mercury emission control may be affected by cost of the sorbent.

Efficiencies of most available mercury emission control technologies depend on the mercury speciation in flue gas. Oxidized mercury is water-soluble and may be removed from flue gas using known wet desulfurization systems (wet-scrubbers). At least some particulate-bound mercury may be removed from flue gas using known particulate collection systems. Elemental mercury is more difficult to remove than oxidized mercury and/or particulate-bound mercury because elemental mercury is unreactive and, as such, cannot be removed from flue gas with wet desulfurization systems or particulate collection system.

In some known systems, because the concentration of mercury in the flue gas is very small (typically less than 10 parts per billion or ppb), diffusion of mercury from the surrounding flue gases may limit the mercury removal process. Most of the flue gases produced in known systems flows in substantially laminar flow patterns and is characterized by slow diffusion rates. Because of the flow characteristics of the flue gas, some known mercury emission reduction systems have attempted to optimize the use of the sorbent by modifying the number and design of sorbent injection lances to achieve sorbent coverage within the flue duct.

BRIEF DESCRIPTION OF THE INVENTION

In one aspect a method for reducing mercury emissions in combustion flue gas is provided. The method includes combusting coal such that a flue gas flow is created. The flue gas flow includes at least mercury and carbon-containing fly ash. The method further includes cooling the flue gas flow within a duct and creating turbulence in the flue gas flow. The mercury is removed from the flue gas flow.

In another aspect a coal-fired power plant is provided. The coal-fired power plant includes a coal combustion zone and a flue gas flow formed within the coal combustion zone. The flue gas flow includes at least carbon-containing fly ash and mercury. The power plant further includes a duct having the flue gas flow therein and a particulate control device coupled to the duct. The particulate control device is configured to collect mercury. A vane assembly is coupled within the duct.

In a still further aspect a pollutant reduction system is provided. The pollutant reduction system includes a duct having a gas flow therein and a particulate control device coupled to the duct. The particulate control device is configured to collect mercury within the gas flow. A vane assembly is coupled within the duct.

DETAILED DESCRIPTION OF THE INVENTION

Figure 1:
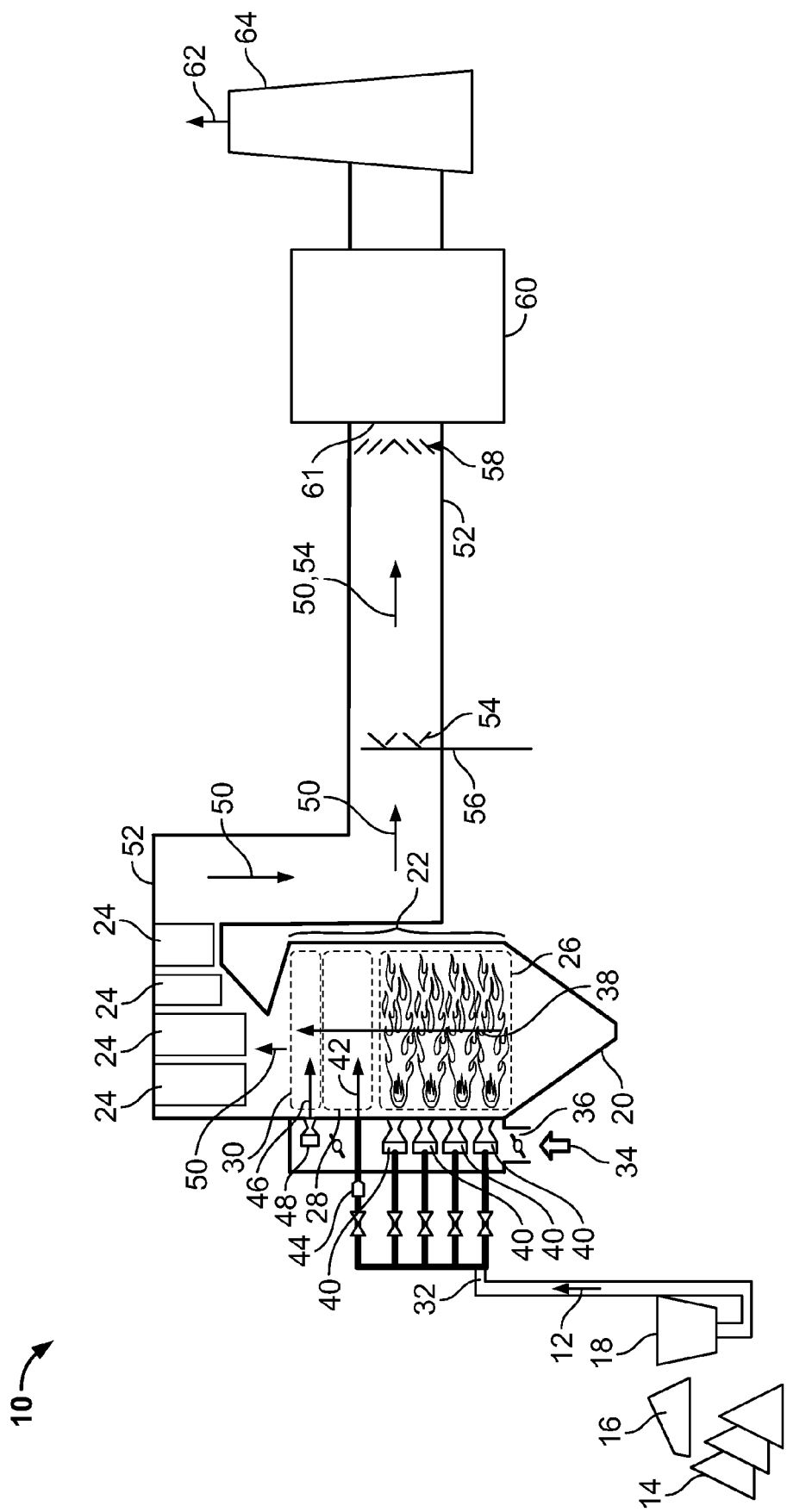
FIG. 1 is a schematic view of an exemplary power plant system.

FIG. 1 is a schematic view of an exemplary power plant system 10. In the exemplary embodiment, system 10 is supplied with fuel 12 in the form of coal 14. More specifically, in the exemplary embodiment, the coal 14 is bituminous coal, such as, but not limited to, Powder River Basin (PRB) coal, lignite coal, and/or any other suitable coal that enables system 10 to function as described herein. Alternatively, fuel 12 may be any other suitable fuel, such as, but not limited to, oil, natural gas, biomass, waste, or any other fossil or renewable fuel. In the exemplary embodiment, coal 14 is supplied to system 10 from a coal supply 16 is processed in a coal mill 18. In the exemplary embodiment, coal 14 is pulverized in coal mill 18 to form coal particles (not shown) having a predetermined and selectable fineness.

In the exemplary embodiment, coal fineness is measured using a known sieve analysis method. Alternatively, coal fineness may be measured using any other suitable method. In sieve analysis, a series of wire mesh screens (not shown) are arranged in a column (not shown) based on ascending openings per inch, for example, a wire mesh screen with 200 openings per inch is referred to as 200 mesh. Exemplary wire mesh screen opening sizes based on openings per inch are listed in Table 1. Alternatively, openings may have sizes that are any other suitable size for the type of mesh used to measure fineness.

TABLE 1

| Mesh size (openings/inch) | Opening size | |
|---|---|---|
|  | inches | millimeters |
| 4 | 0.187 | 4.75 |
| 10 | 0.066 | 1.70 |
| 20 | 0.0334 | 0.850 |
| 32 | 0.0196 | 0.500 |
| 48 | 0.0118 | 0.300 |
| 60 | 0.0098 | 0.250 |
| 80 | 0.0070 | 0.180 |
| 100 | 0.0059 | 0.150 |
| 170 | 0.0035 | 0.090 |
| 200 | 0.0029 | 0.075 |

In the exemplary embodiment, a coal particle (not shown) passing through a 200 mesh screen has a diameter (not shown) less than approximately 0.0029" or 0.075 mm. Further, in the exemplary embodiment, coal fineness is measured by the percentage of coal particles passing through a wire mesh screen. A fineness of coal measurement may be, for example, but not limited to being, 70%<200 mesh, which denotes that 70 percent of the coal particles pass through a mesh screen having 200 openings per inch. As such, coal fineness is measured as an average coal particle size. Alternatively, coal fineness may be quantized using any other suitable method and/or measurement system.

In the exemplary embodiment, fuel 12, such as, for example, coal 14 from coal mill 18, is supplied to a boiler or a furnace 20. More specifically, in the exemplary embodiment, system 10 includes a coal-fired furnace 20 that includes a combustion zone 22 and heat exchangers 24. Combustion zone 22 includes a primary combustion zone 26, a reburning zone 28, and a burnout zone 30. Alternatively, combustion zone 22 may not include reburning zone 28 and/or burnout zone 30 such that furnace 20 is a "straight fire" furnace (not shown). Fuel 12 enters system 10 through a fuel inlet 32, and air 34 enters system 10 through an air inlet 36. Primary combustion zone 26 ignites the fuel/air mixture to create combustion gas 38.

In the exemplary embodiment, fuel 12 and air 34 are supplied to primary combustion zone 26 through one or more main injectors and/or burners 40. Main burners 40 receive a predetermined amount of fuel 12 from fuel inlet 32 and a predetermined quantity of air 34 from air inlet 36. Burners 40 may be tangentially arranged in each corner of furnace 20, wall-fired, or have any other suitable arrangement that enables furnace 20 to function as described herein. Within primary combustion zone 26, combustion gas 38 is formed, and may include, but is not limited to including, carbon, carbon containing fly ash, carbon dioxide, carbon monoxide, water, hydrogen, nitrogen, sulfur, chlorine, and/or mercury. Fuel products not contained in combustion gas 38 may be solids and may be discharged from furnace 20 as waste (not shown).

In the exemplary embodiment, combustion gases 38 flow from primary combustion zone 26 towards reburning zone 28. In reburning zone 28, a predetermined amount of reburn fuel 42 is injected through a reburn fuel inlet 44. Reburn fuel 42 is supplied to inlet 44 from fuel inlet 32. Although reburn fuel 42 and fuel 12 are shown as originating at a common source, such as fuel inlet 32, reburn fuel 42 may be supplied from a source other than fuel inlet 32, and/or may be a different type of fuel than fuel 12. For example, fuel 12 entering through fuel inlet 32 may be, but is not limited to being, pulverized coal, and reburn fuel 42 entering through a separate reburn fuel inlet (not shown) may be natural gas. In the exemplary embodiment, the amount of reburn fuel 42 injected is based on a desired stoichiometric ratio within reburning zone 28. More specifically, in the exemplary embodiment, the amount of reburn fuel 42 creates a fuel-rich environment in reburning zone 28. As such, less of the carbon in fuel 12 and in reburn fuel 42 is combusted, which facilitates increasing the Loss on Ignition (LOI) and facilitates creating a more reactive, high-carbon content fly ash entrained in combustion gases 38.

In the exemplary embodiment, combustion gases 38 flow from reburning zone 28 into burnout zone 30. Overfire air 46 is injected into burnout zone 30 through an overfire air inlet 48 and, a predetermined quantity of overfire air 46 is injected into burnout zone 30. In the exemplary embodiment, overfire air inlet 48 is in flow communication with air inlet 36. Alternatively, overfire air 46 may be supplied to system 10 through an inlet 48 that is separate from air inlet 36. The quantity of overfire air 46 is selected based on a desired stoichiometric ratio within burnout zone 30. More specifically, in the exemplary embodiment, the quantity of overfire air 46 is selected to facilitate completing combustion of fuel 12 and reburn fuel 42, which facilitates reducing pollutants in combustion gas 38, such as, but not limited to, nitrogen oxides, $NO_x$, and/or carbon monoxide, CO.

In the exemplary embodiment, flue gas 50 exits combustion zone 22 and may include, but is not limited to including, carbon, carbon-containing fly ash, carbon dioxide, carbon monoxide, water, hydrogen, nitrogen, sulfur, chlorine, and/or mercury. Flue gas 50 exits combustion zone 22 and enters heat exchangers 24. Heat exchangers 24 transfer heat from flue gas 50 to a fluid (not shown) in a known manner. More specifically, the heat transfer heats the fluid, such as, for example, heating water to generate steam. The heated fluid, for example, the steam, is used to generate power, typically by known power generation methods and systems (not shown), such as, for example, a steam turbine (not shown). Alternatively, heat exchangers 24 transfer heat from flue gas 50 to a fuel cell (not shown) used to generate power. Power may be supplied to a power grid (not shown) or any suitable power outlet.

In the exemplary embodiment, flue gas 50 flows from heat exchangers 24 to a duct or convective pass 52. As flue gas 50 flows through convective pass 52, the gas 50 is cooled to a temperature that is less than the combustion temperature. More specifically, in the exemplary embodiment, flue gas 50 within pass 52 is cooled convectively, conductively, and/or radiantly by ambient air (not shown) and/or any other suitable cooling fluid (not shown). In the exemplary embodiment, the cooling fluid at least partially surrounds pass 52 to facilitate cooling flue gases 50 therein. In an alternative embodiment, the cooling fluid is vented into pass 52 to facilitate cooling flue gases 50. In another alternative embodiment, system 10 includes cooling fluid at least partially surrounding pass 52 and cooling fluid vented into pass 52 to facilitate cooling flue gases 50. In the exemplary embodiment, flue gas 50 is cooled to a temperature that enables mercury to react with the carbon in the fly ash, for example, but not limited to, a temperature below 350° F. As such, mercury is oxidized by, and captured by, carbon, chlorine, and/or any other suitable mercury-reactive elements and/or compounds in flue gas 50.

In the exemplary embodiment, a predetermined amount of sorbent 54 is injected into convective pass 52 to react with flue gas 50. In the exemplary embodiment, sorbent 54 is injected into pass 52 through a sorbent injector 56. Alternatively, sorbent 54 is not injected to convective pass 52, but rather mercury entrained in flue gas 50 reacts only with elements and/or compounds present within flue gas 50. The sorbent 54 injected is selected to facilitate oxidation of mercury. For example, in the exemplary embodiment, sorbent 54 is activated carbon. Alternatively, sorbent 54 may be any other suitable element and/or compound that facilitates oxidation of mercury.

In the exemplary embodiment, a plurality of vanes 58 are positioned within pass 52. More specifically, vanes 58 are downstream from sorbent injector 56, and upstream of a particulate control device 60, near a particulate control device inlet 61. As a result, during operation, sorbent 54 flows through convective pass 52 for about 0.1-0.5 seconds before being channeled through vanes 58. Alternatively, vanes 58 may be positioned upstream of both sorbent injector 56 and particulate control device 60. In an alternative embodiment that does not include sorbent injector 56, vanes 58 are coupled within pass 52, downstream from heat exchangers 24, and upstream of particulate control device 60. In the exemplary embodiment, vanes 58 are turning vanes (not shown). Alternatively, vanes 58 may be any other suitable type of vane that enables system 10 to function as described herein.

In the exemplary embodiment, the number, orientation, and/or configuration of vanes 58 is based on the configuration of system 10. More specifically, the number, orientation, and/or configuration of vanes 58 is selected to facilitate increasing the turbulence in the flow of flue gases 50 without substantially increasing a pressure drop within convective pass 52. Further, in the exemplary embodiment, particulate control device 60 may be, for example, but not limited to, an electrostatic precipitator (not shown) or a baghouse (not shown), used to collect particles containing oxidized mercury and/or particulate-bound mercury.

In an alternative embodiment, system 10 may also include an ash burnout unit (not shown) and/or a mercury collection unit (not shown) coupled to particulate control device 60. The ash burnout unit facilitates the removal of carbon from flue gas 50, which desorbs mercury from the fly ash. The mercury collection unit is coupled to the ash burnout unit and may include activated carbon, or any other suitable reagent, for capturing mercury desorbed by the burnout unit. System 10 may further include a wet scrubber (not shown) and/or a dry scrubber (not shown) positioned downstream of particulate control device 60 for removing oxidized mercury and/or particulate-bound mercury from flue gas 50 and/or for removing other compounds and/or elements from flue gas 50, such as, for example, sulfur dioxide. At least partially decontaminated flue gases 50 exit system 10 as exhaust gases 62 discharged through an exhaust stack 64.

During operation of system 10, fuel 12, air 34, reburn fuel 42, and/or overfire air 46 are injected and combusted in combustion zone 22 to form flue gases 50 that include, but are not limited to including, carbon, carbon containing fly ash, carbon dioxide, carbon monoxide, water, hydrogen, nitrogen, sulfur, chlorine, and/or mercury. Flue gases 50 flow from combustion zone 22 through heat exchangers 24, and into convective pass 52. In the exemplary embodiment, the flow of flue gases 50 through convective pass 52 is substantially laminar, except where the geometry of pass 52 causes minor turbulence.

As the gases 50 cool in convective pass 52, mercury reacts with carbon within the flue gases 50 to form oxidized mercury. Mercury may also react with elements and/or compounds within flue gas 50 to form particulate-bound mercury. In the exemplary embodiment, sorbent 54 is injected into cooling flue gas 50 such that mercury within flue gas 50 reacts with sorbent 54 to form oxidized and/or particulate bound mercury. For reactions to occur between mercury and other reactive elements and/or compounds within flue gas 50 and/or sorbent 54, mercury must collide with such reactive particles in a reactive orientation. As such, the rate of mercury oxidation is affected by the number of collisions between mercury and other reactive particles in flue gas 50 and/or sorbent 54. Further, mercury reactions occur at temperatures cooler than the combustion temperature, such as, but not limited to, temperatures below 350° F. As a result, mercury reactions with fly ash and/or other suitable elements and/or compounds take place mainly at particulate control device inlet 61 and/or within particulate control device 60. Absorption of mercury on a surface of a carbon-containing particle is relatively fast process, and, as such, mercury in the nearest proximity to carbon containing particles is absorbed first.

In the exemplary embodiment, vanes 58 create a substantially turbulent flow in the flow of flue gas 50. Turbulence in flue gas 50 increases the number of collisions between mercury and other particles, which increases the mercury chemical reaction rate within flue gas 50 and/or between flue gas 50 and sorbent 54. As such, as the number of collisions between mercury and other particles increases, the possibility that mercury will oxidize or become particulate-bound also increases. As a result of the collisions and reactions caused by turbulence in flue gas 50, the percentage of oxidized mercury and particulate-bound mercury in flue gas 50 is increased while the percentage of elemental mercury in flue gas 50 is decreased.

The above-described method and apparatus facilitates reducing mercury from combustion exhaust gas by improving natural mercury capture on fly ash and improving sorbent utilization. The diffusion rate of mercury atoms to carbon particles within the flue gas is greater in substantially turbulent flow in comparison to a substantially laminar flow, therefore increasing flue gas flow turbulence facilitates improving mercury absorption on carbon within the flue gas, and, more specifically, on the carbon-containing fly ash within the flue gas. Furthermore, the efficiency of mercury removal using sorbent injection is facilitated to be increased when the sorbent is substantially uniformly distributed across a flue duct cross-section because the uniform distribution facilitates utilizing the mercury removal capacity of the sorbent. Turbulence in the flue gas flow facilitates increasing the uniformity of the distribution of the sorbent across the flue duct cross-section. As such, turbulence in the flue gas flow facilitates decreasing the requirements for the amount of sorbent injected for mercury control by facilitating improving the mixing of carbon-contain fly ash, sorbent, and mercury within the flue gas flow. Because turbulence in the flue gas flow facilitates increasing mercury absorption on sorbent, the sorbent is facilitated to be utilized more effectively, and the amount of sorbent to achieve the same mercury removal efficiency is facilitated to be decreased.

Further, because flow turbulization also facilitates improving mercury absorption on carbon-containing fly ash, requirements for sorbent injection are facilitated to be reduced in comparison to coal-fired power plants that do not include a vane assembly for turbulizing the flue gas flow. The above-described method and apparatus facilitate reducing mercury from combustion exhaust gas by achieving mercury reduction while facilitating decreasing the requirement for sorbent injection. The efficiency of natural mercury capture on carbon-containing fly ash and the efficiency of sorbent utilization can are facilitated to be increased by introducing turbulent mixing of fly ash, sorbent, and/or mercury-containing flue gas. Such mixing at the location downstream of sorbent injection and upstream of particulate control device facilitates increasing the amount of mercury the particulate control device removes from the flue gas flow.

Exemplary embodiments of a method and apparatus for removing mercury from combustion exhaust gas are described above in detail. The method and apparatus are not limited to the specific embodiments described herein, but rather, components of the method and apparatus may be utilized independently and separately from other components described herein. For example, the vane assembly may also be used in combination with other pollution control systems and methods, and is not limited to practice with only the coal-fired power plant as described herein. Rather, the present invention can be implemented and utilized in connection with many other pollutant emission reduction applications.

While the invention has been described in terms of various specific embodiments, those skilled in the art will recognize that the invention can be practiced with modification within the spirit and scope of the claims.

What is claimed is:

1. A method for reducing mercury emissions in combustion flue gas, said method comprising:
    combusting coal to create a flue gas flow that includes at least mercury and carbon-containing fly ash;
    cooling the flue gas flow within a duct;
    channeling the flue gas flow past a vane assembly to create turbulence in the flue gas flow, wherein the vane assembly extends at least partially across a flue gas flow path; and
    removing mercury from the flue gas flow.

2. A method in accordance with claim 1 further comprising injecting a sorbent into the duct.

3. A method in accordance with claim 2 wherein injecting a sorbent into the duct further comprises injecting sorbent into the duct upstream from a vane assembly.

4. A method in accordance with claim 1 wherein removing mercury from flue gas flow further comprises removing mercury from flue gas flow using a particulate control device.

5. A method in accordance with claim 4 wherein removing mercury from flue gas flow using a particulate control device further comprises coupling the particulate control device to the duct downstream from a vane assembly.

6. A method in accordance with claim 1 wherein channeling the flue gas flow past a component further comprises channeling the flue gas flow past a vane assembly configured to facilitate increasing contact between mercury and a plurality of particles within the flue gas flow downstream from the vane assembly.

7. A method in accordance with claim 1 wherein combusting coal to create a flue gas flow further comprises combusting a low-rank coal such that the flue gas flow is created.

8. A coal-fired power plant comprising:
    a coal combustion zone configured to generate a flue gas flow that includes at least carbon-containing fly ash and mercury;
    a duct coupled to said combustion zone for channeling said flue gas flow therethrough;
    a particulate control device coupled to said duct, said particulate control device is configured to collect mercury from said flue gas flow; and
    a vane assembly coupled within said duct, said vane assembly extends at least partially through said flue gas flow.

9. A coal-fired power plant in accordance with claim 8 wherein said vane assembly is coupled upstream from said particulate control device.

10. A coal-fired power plant in accordance with claim 8 wherein said vane assembly induces turbulence to said flue gas flow.

11. A coal-fired power plant in accordance with claim 8 further comprising a sorbent injector configured to inject a sorbent into said duct.

12. A coal-fired power plant in accordance with claim 11 wherein said sorbent injector is configured to inject sorbent into said duct upstream from said vane assembly.

13. A coal-fired power plant in accordance with claim 8 wherein said vane assembly facilitates increasing the reaction between mercury and a plurality of particles within said flue gas flow downstream from said vane assembly.

14. A pollutant reduction system comprising:
    a duct for channeling a gas flow therethrough;
    a particulate control device coupled to said duct, said particulate control device is configured to collect mercury from said gas flow; and
    a vane assembly coupled within said duct, said vane assembly extends at least partially across said gas flow.

15. A pollutant reduction system in accordance with claim 14 wherein said vane assembly is coupled upstream from said particulate control device.

16. A pollutant reduction system in accordance with claim 14 wherein said vane assembly induces turbulence to said gas flow.

17. A pollutant reduction system in accordance with claim 14 wherein said vane assembly facilitates increasing contact between mercury and a plurality of particles within said gas flow downstream from said vane assembly.

18. A pollutant reduction system in accordance with claim 14 wherein a sorbent injector is coupled upstream from said vane assembly.

19. A pollutant reduction system in accordance with claim 18 wherein said sorbent injector injects a sorbent at least partially into said gas flow, said sorbent is reactive with mercury.

* * * * *